United States Patent [19]

Tokuhara

[11] Patent Number: 4,560,999
[45] Date of Patent: Dec. 24, 1985

[54] PRINTER HEAD AND ELECTROPHOTOGRAPHIC PRINTER UTILIZING THE SAME

[75] Inventor: Mitsuhiro Tokuhara, Chigasaki, Japan

[73] Assignee: Canon Kabushiki Kaisha, Tokyo, Japan

[21] Appl. No.: 566,165

[22] Filed: Dec. 28, 1983

[30] Foreign Application Priority Data

Jan. 11, 1983 [JP] Japan ................................. 58-2637

[51] Int. Cl.$^4$ ........................................... G01D 15/14
[52] U.S. Cl. ................................... 346/160; 346/107; 350/174; 350/337; 350/345; 350/388; 350/401
[58] Field of Search ........................... 346/107 R, 160; 358/300, 302; 350/169–170, 172–174, 345, 331 R, 337, 351, 356, 388, 400, 401

[56] References Cited

U.S. PATENT DOCUMENTS 3,704,997 12/1972 Smith .................................. 350/401
4,392,722 7/1983 Shirasaki ............................ 350/400

FOREIGN PATENT DOCUMENTS 57-63507 4/1982 Japan.

Primary Examiner—Thomas H. Tarcza
Attorney, Agent, or Firm—Fitzpatrick, Cella, Harper & Scinto

[57] ABSTRACT

A printer head comprising a light source device, and an optical modulator element for switching the light projected from the light source device, a device for splitting the light projected from the light source device into two polarized light components to form respectively a first light path and a second light path, a device for converting the polarized light of the second light path into light having the same polarization as the light component of the first light path, and a device for directing light of the first light path and/or the second light path to the optical modulator element.

20 Claims, 5 Drawing Figures

PRINTER HEAD AND ELECTROPHOTOGRAPHIC PRINTER UTILIZING THE SAME

BACKGROUND OF THE INVENTION

1. Field of the Invention

The present invention relates to printer heads, particularly those having an optical modulator element such as a liquid-crystal-optical shutter, and more particularly, to those having a liquid-crystal optical shutter which are applicable to printers utilizing an electrophotographic technique.

2. Description of the Prior Art

Recently there has been a growing demand for a printer which fulfills such requirements as high-speed and high-density printing, low price, low noise operation, and high reliability. This is due to a need for an output mechanism adaptable for recently developing electronic techniques in the field of information transmission, processing, and making. Almost all of the signals for information output are electric or are convertible into electric signals. As electric information output terminals for printers, there are used ink-jet printers, multi-stylus wire dot printers, laser beam printers, etc. Printers utilizing an electrophotographic copying system having a photosensitive drum are also widely used. Laser beam printers, however, have drawbacks in that these are expensive and require strict mechanical and optical accuracy in making them. Possible substitutes for laser beam printers include solid optical shutter arrays, but no optical shutter array satisfying various requirements has yet been put to practical use. There are a number of candidates for electro-optical elements, materials, or assemblies as a technique for realizing a successful solid shutter array. Among them, a system utilizing a liquid crystal has been noticed from early time in view of its easy production and its possibility of achieving optical modulation with low voltage and low power. However, liquid crystals have been deserted by many researchers as unpromising for substituting for the laser beam means, in that liquid crystals exhibit low response speeds and difficult time-division drive. Nevertheless, many efforts have been made over the years to operate liquid crystals at high response speeds, but with the result that none of the proposals hitherto made could accomplish a satisfactory technique superior to the laser beam technique. The main reasons for this are the insufficient understanding of the electrophotographic phenomenon of liquid crystals and the above-mentioned preconception that liquid crystals are not adapted to high speed operation or high density recording.

Some prior art suggested the application of a liquid-crystal-optical shutter array to the head of an electrographic copying machine for realizing a high response speed with a liquid crystal (e.g. Japanese Patent Laid-open Application Nos. 63507/82 and 63508/82). The liquid-crystal-optical shutter array has the form of a twisted nematic liquid crystal cell sandwiched between a pair of polarizing plates disposed usually in the cross state of nicol, and operates as follows: when no operational voltage is applied to the liquid crystal cell, the polarizing plate on the incident light side transmits only one of the P-component (P-polarized light) and S-component (S-polarized light) of the incident light and the polarizing plate on the other side (in the cross nicol state) shuts the above transmitted light, so that the array thus produces the closed state of the aperture. On the other hand, when operational voltage is applied to the cell, a change occurs in the operation mode of the liquid crystal and the one of P- and S-components of the incident light which is transmitted by the liquid crystal cell also passes the polarizing plate disposed behind the cell, so that the array produces the open state of the aperture.

However, the printer head utilizing such an optical modulator element as the liquid-crystal-optical shutter in the prior art has the drawback of a large loss of light intensity caused by the pair of polarizing plates used and hence a decreased quantity of light illuminating the photosensitive drum in the open state of the aperture. In a special case, for instance, the light quantity is decreased to about ½ by the polarizing plate disposed on the incident light side and is further decreased by the polarizing plate disposed behind the liquid crystal cell; thus the light quantity illuminating the photosensitive drum is decreased to about 25–50% of the light quantity emitted from the light source. A large loss of the light necessitates an increased light source wattage, and this produces undersirable effects such as excess heat generation and a change in temperature-dependent characteristics of the liquid crystal itself and results in an uneconomically large power consumption. With the conventional voltage to the light source, the printing speed is low because of a limited exposure of the photosensitive drum.

SUMMARY OF THE INVENTION

An object of the present invention is to provide a printer head sutiable for a high-speed printer.

Another object of the present invention is to provide a printer head utilizing a liquid-crystal-optical shutter, by which the loss of light is minimized.

Another object of the present invention is to provide an electrophotographic printer which can form high-density images with a high printing speed.

According to one aspect of the present invention there is provided a printer head provided with a light source device and an optical modulator element for switching the light projected from the light source device, the printer head having a means of splitting the light projected from the light source device into two polarized light components to form respectively a first light path and a second light path, a means of converting the polarizing light of the second light path into a light component of the same polarization as that of the light component of the first light path, and a means of directing the first light path and/or the second light path to the optical modulator element.

According to another aspect of the present invention, there is provided an electrophotographic printer having a printer head and a photosensitive member, the printer head being provided with a light source device and an optical modulator element for switching the light projected from the light source device, the printer having a means of splitting the light projected from the light source device into two polarized light components to form respectively a first light path and a second light path, a means of converting the polarized light of the second light path into a light component of the same polarization as that of the light component of the first light path, and a means of directing the first light path and/or the second light path to the optical modulator element.

DETAILED DESCRIPTION OF THE PREFERRED EMBODIMENT OF THE INVENTION

The printer head of the invention is of a type having an optical modulator element, e.g., a liquid crystal element which, on application of operational voltage, changes its mode of operation to switch a light beam incident thereupon, and is characterized in that a light beam from a light source is introduced into a means, e.g., a polarized-beam splitter, of splitting the luminous flux into two polarized light components to form the first and second light paths; thereby one polarized light component beam (e.g., the first light path beam) is led directly to the liquid crystal and the other polarized light component beam (e.g., the second light path beam) is passed through a half-wave plate over a reflector, and to the liquid crystal; and the light modulated and passed through the liquid-crystal switching element is introduced through an analyzer into an image-forming element which has a numerical aperture larger than that corresponding to the incident angle of the beam entering the liquid crystal after passing through the half-wave plate and over the reflector, to form an image, corresponding to light signals, on a photosensitive member.

Figure 1:
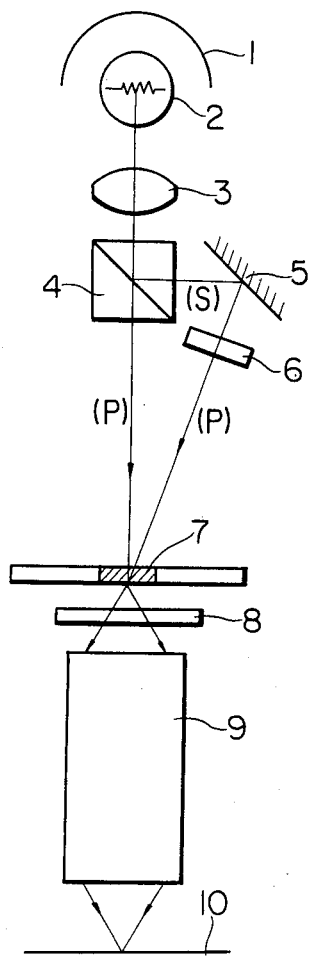
FIG. 1 is a schematic sectional view of the printer head of the present invention.

FIG. 1 is a sectional view of the preferred embodiment of the printer head of the invention, wherein 2 is a light source, for example, a fluorescent lamp, 1 a reflecting shade serving to enhance the illuminating efficienty, 3 a condenser, 4 a polarized-beam splitter, 5 a reflector (reflecting means), 6 a half-wave plate, 7 a liquid crystal, 8 an analyzer and 9 an image-forming optical system to form an image, corresponding to light signals sent from the liquid-crystal switching element, on a photosensitive member 10.

Beams from the light source 2 are allowed to enter the polarized-beam splitter 4 through the beam condensing unit consisting of the reflecting shade 1 and the condenser 3. The polarized-beam splitter 4, as shown in FIG. 1, functions to split the incident natural polarized beam into two polarized beams (P-component and S-component), transmit one of the polarized beams, and reflect the other.

Figure 2:
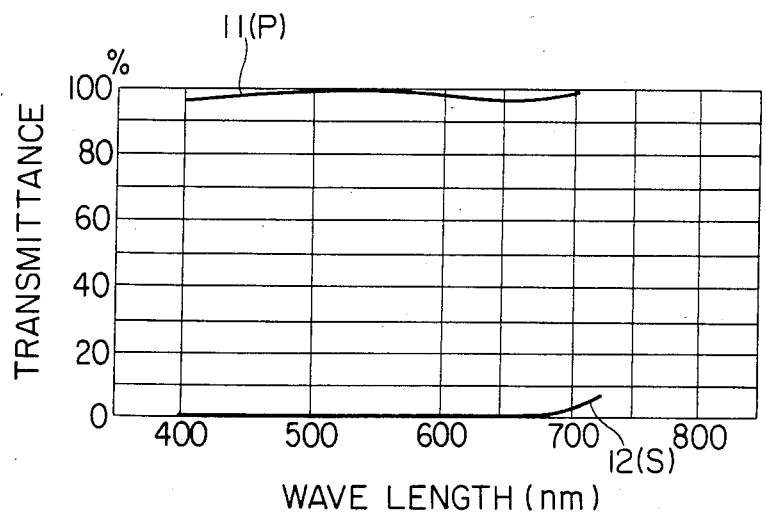
FIG. 2 is an illustration showing an optical characteristic of a polarized-beam splitter attached to the printer head of the invention.

FIG. 2 shows an optical characteristic of the polarized-beam splitter 4. In FIG. 2, the curve 11 indicates percentages of the P-component transmitted by the splitter 4 and shown that 95–98% or more of the P-component is transmitted. The curve 12 indicates percentages of the S-component transmitted by the splitter 4 and shown that almost all the S-component is reflected. The P-component transmitted from the polarized-beam splitter 4 being such a characteristic passes straight through the splitter and illuminates the liquid crystal 7. On the other hand, the S-component reflected from the polarized-beam splitter 4 is further reflected by the reflector 5, converted by the half-wave plate 6 into a P-component, and similarly illuminates the liquid crystal 7. If the illuminated liquid crystal 7 rotates the polarization plane of polarized light in the state of the operational voltage being applied (hereinafter, this state is referred to as the on-state) and does not in the state of no voltage applied (hereinafter referred to as the off-state), the light passing through the liquid crystal in the on-state travels through the analyzer 8 which acts to shut the P-component (transmists the S-component), and arrives at the surface of the photosensitve member 10 through the image-forming element 9. In the off-state, the light is shut off by the analyzer 8, not arriving at the photosensitive member 10. In the above optical system, the numerical aperture of the image-forming element 9 is designed to be larger than the incident angle of the beam illuminating the liquid crystal 7 from the reflector 5. Thus, nearly 100% of the light from the light source 2 reaches the liquid crystal 7 owing chiefly to the adoption of the polarized-beam splitter 4 and the half-wave plate 6. Additionally, since the numerical aperture of the image-forming element 9 is sufficiently large as to utilize also the light coming from the direction of the reflector 5, the loss of light between the liquid crystal 7 and the photosensitive member 10 is only of the order of the loss due to the analyzer 8, the efficiency of light transmission therebetween thus being much improved.

Figure 3:
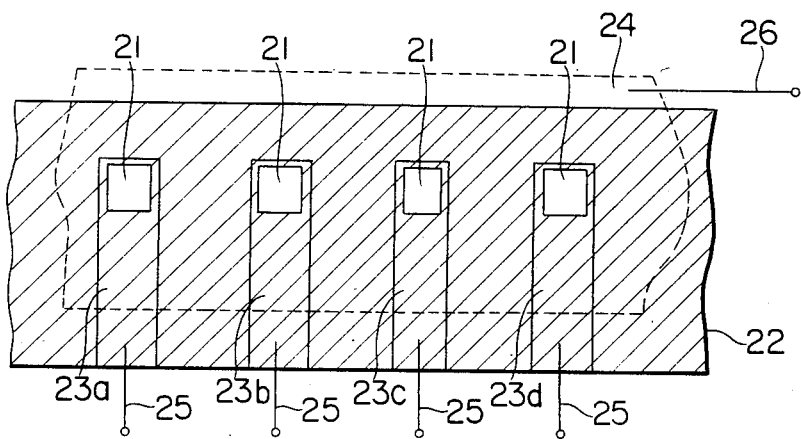
FIG. 3 is a plan view of a liquid-crystal-optical shutter array used in the printer head of the invention.

FIG. 3 illustrates the structure of the liquid-crystal shutter array element, which will be most readily understood. As shown in FIG. 3, this element has openings 21 and the other portion, shown shaded, is usually masked to prevent light leakage. A liquid crystal is sealed in between signal electrodes 23 (23a, 23b, 23c, 23d . . . ) on the inside wall of a substrate 22 and a common electrode 24 opposite to the signal electrodes 23. The common electrode 24 is supported by a substrate consisting of a transparent plate of glass, plastics, or the like (not shown in FIG. 3). Such a transparent plate can also be used for the substrate 22 supporting the signal electrodes 23. The space between the substrates is fixed by means of a sealing spacer made of a material such as a polyester film, glass-fiber-filled epoxy adhesive, or frit glass. The signal electrodes 23 and the common electrode 24 can be formed with transparent conductive films of tin oxide, ITO (indium oxide containing 5 wt % tin oxide), or the like. Each electrode 23 and the common electrode 24 have lead wires 25 and 26, respectively, which are connected to respective circuits (not shown in the figures) for operating the shutter array.

Figure 4:
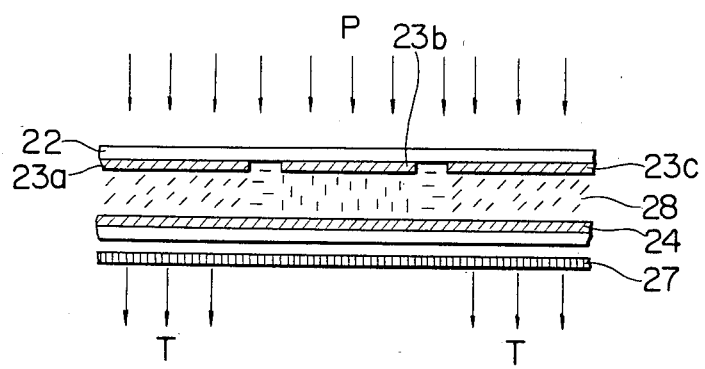
FIG. 4 is a sectional view of the array shown in FIG. 3.

FIG. 4 is a sectional view of the liquid-crystal shutter array shown in FIG. 3, illustrating an example of the action of the shutter array.

The transmission of the incident light from the polarized beam splitter is controlled by the shutter array, which is switched by selecting the members of the signal electrodes 23 (23a, 23b, 23c, . . . ) to which operational voltage is to be applied, thereby controlling the orientation state of the liquid crystal 28 between the signal electrodes 23 and the opposite common electrode 24.

In FIG. 4, a polarizing plate 27 is disposed in the cross nicol state to the polarized beam P-component coming from a polarized-beam splitter which is as shown in FIG. 1. Further, the two substrates have undergone an aligning-treatment such as rubbing treatment or the like so as to control the initial orientation direction of the liquid crystal 28 at 45 degree to the polarization direction of the polarizing plate 27. The liquid crystal 28 used in this case is of a type having a positive dielectric anisotropy (P-type liquid crystal).

Setting the shutter array as described above, the voltage to be applied is chosen and the common electrode 24 is usually grounded. FIG. 4 shows a case where a relatively high voltage is applied to the signal electrode 23b. In this case, molecules of P-type liquid crystal in the region corresponding to the signal electrode 23b align, for instance, in the direction nearly perpendicular to the cell surface, where the incident light P does not pass through this region. On the contrary, no voltage or a voltage lower than the threshold value is applied to the signal electrodes 23a and 23c, where molecules of the P-type liquid crystal in these regions align in a direction different from the perpendicular direction, whereby the incident light P from the polarized-beam splitter passes through these regions (transmitted light T).

Light signals are produced by inputting digital signals as image information to the electrodes of the above liquid-crystal shutter array to form open apertures in given positions of the liquid crystal. Then these light signals are made to illuminate an electrically charged photosensitive drum to form an electrostatic latent image thereon, which is subsequently converted to a visible image by toner-development.

Figure 5:
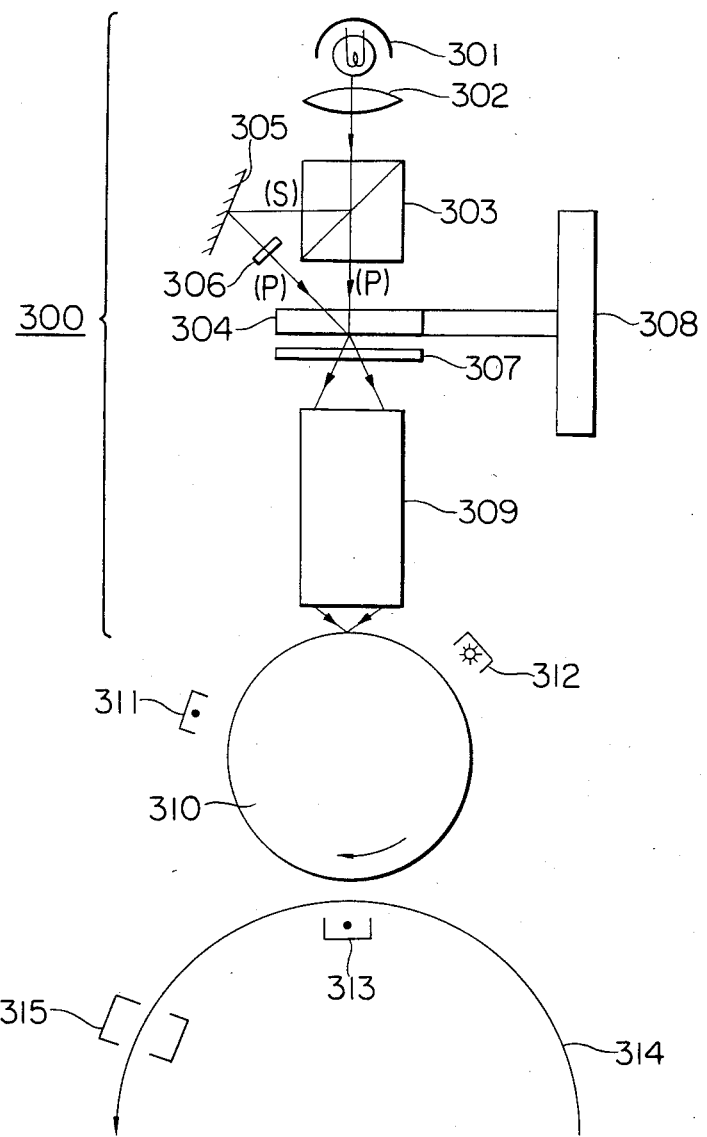
FIG. 5 is a schematic plan view of the electrophotographic printer of the invention.

FIG. 5 illustrates an embodiment of showing the application of the printer head, 300, of this invention to an electrophotographic printer. In FIG. 5, a light source 301 is kept lit during use. Beams from this light source 301 are converged by a condenser 302 and split by a polarized-beam splitter into a P-component polarized beam and an S-component polarized beam. The P-component polarized beam directly illuminates a liquid-crystal shutter array 304, while the S-component polarized beam is reflected by a reflector 305, and converted with a half-wave plate into a P-component polarized beam, which then illuminates the liquid-crystal shutter array 304.

An analyzer 307 is disposed behind the liquid-crystal shutter array, in the cross nicol state to the P-component polarized beams.

Both P-components of polarized light are transmitted selectively through the shutter array which is driven by the liquid-crystal operating circuits 308, thus generating light signals which pass through the image forming element 309 to form an image on the photosensitive drum.

The photosensitive drum 310 is given positive or negative electric charge, prior to the irradiation with light signals, at a charging assembly 311 provided with a corona discharging unit or the like. Electric charge on the irradiated areas of the photosensitive drum 310 disappears, thus forming an electrostatic latent image. The formed electrostatic latent image is developed with a developer consisting of a toner and a carrier at a development assembly 312 by the magnetic brush method or other methods while applying a development bias, wherein the developer is of the polarity usually opposite to or, in the case of reversal development, the same as the polarity of the charge previously given to the drum. The developed image is then transferred onto an image-supporting material 314 (e.g., paper) at a transfer assembly 313, and fixed with heat or pressure at a fixing assembly 315, thus giving a completely fixed print.

The printer head of this invention permits utilizing about 90–100 % of the light quantity (including P-component and S-component) from the illumination system to the liquid-crystal shutter array, whereas the conventional printer head only about 50%. consequently, it has become possible by using the printer head of the present invention to operate the light source with lowered voltage and hence with less heat generation, to stabilize the switching operation of the liquid-crystal shutter array, and to realize high-speed printing.

What I claim is:

1. A printer head comprising a light source device, an optical modulator element for switching the light projected from the light source device, a means for splitting the light projected from the light source device into two polarized light components which components respectively propagate along a first light path and a second light path, a means for converting the polarized light of the second light path into light having the same polarization as the light component of the first light path, and a means for directing light of at least one of the first and second light paths to the optical modulator element.

2. The printer head of claim 1, wherein the optical modulator element is a liquid crystal element.

3. The printer head of claim 2, further comprising an analyzer for receiving light from the liquid crystal element.

4. The printer head of claim 1, wherein the means of splitting the projected light into two polarized light components to form respectively a first light path and a second light path is a polarized-beam splitter.

5. The printer head of claim 4, wherein the polarized-beam splitter is a means of transmitting one of the polarized light components and reflecting the other.

6. The printer head of claim 4, further comprising a condenser between the polarized-beam splitter and the light source device.

7. The printer head of claim 1, wherein the means of converting the polarized light of the second light path into light having the same polarization as the light component of the first light is a half wave plate.

8. The printer head of claim 1, wherein the means of directing light to the optical modulator element is a reflecting means.

9. The printer head of claim 1, wherein the light of the first light path is a P-component polarized beam and the light of the second light path is an S-component polarized beam.

10. An electrophotographic printer having a printer head and a photosensitive member, the printer head comprising a light source device, an optical modulator element for switching the light projected from the light source device, a means of splitting the light projected from the light source device into two polarized light components which components propagate respectively along a first light path and a second light path, a means of converting the polarized light of the second light path into light having the same polarization as the light component of the first light path, and a means of directing light of at least one of the first and second light paths to the optical modulator element.

11. The electrophotographic printer of claim 10, wherein the optical modulator element is a liquid crystal element.

12. The electrophotographic printer of claim 11, further comprising an analyzer for receiving light from the liquid crystal element.

13. The electrophotographic printer of claim 10, wherein the means of splitting the projected light into two polarized light components to form respectively a first light path and a second light path is a polarized-beam splitter.

14. The electrophotographic printer of claim 13, wherein the polarized-beam splitter is a means of transmitting one of the polarized light components and reflecting the other.

15. The electrophotographic printer of claim 13, further comprising a condenser between the polarized-beam splitter and the light source device.

16. The electrophotographic printer of claim 10, wherein the means of converting the polarized light of the second light path into light having the same polarization as the light component of the first light path is a half-wave plate.

17. The electrophotographic printer of claim 10, wherein the means of directing light to the optical modulator element is a reflecting means.

18. The electrophotographic printer of claim 10, wherein the light of the first light path is a P-component polarized beam and the light of the second light path is an S-component polarized beam.

19. The electrophotographic printer of claim 10, which has an image-forming element between the optical modulator element and the photosensitive member.

20. The electrophotographic printer of claim 19, wherein the image-forming element has a numerical aperture larger than the incident angle of the first light path or the second light path entering the optical modulator element.

* * * * *

UNITED STATES PATENT AND TRADEMARK OFFICE
CERTIFICATE OF CORRECTION

PATENT NO. : 4,560,999
DATED : December 24, 1985
INVENTOR(S) : MITSUHIRO TOKUHARA It is certified that error appears in the above-identified patent and that said Letters Patent is hereby corrected as shown below:

```
Col. [57] Abstract, change "device, and an" to --device, an--.
Col. 6, line 42, change "half wave plate." to --half-wave
                                                      plate.--.
Col. 8, line 11, change "which has" to --further comprising--.
Col. 2, line 33, change "sutiable" to --suitable--.
Col. 3, line 43, change "efficienty," to --efficiency,--.
Col. 3, line 61, change "shown" to --shows--.
Col. 3, line 64, change "shown" to --shows--.
Col. 4, line 11, change "(transmists the" to --(transmits the--.
Col. 5, line 1, change "degree" to --degrees--.
Col. 5, line 29, change "embodiment of" to -- embodiment  --.
Col. 6, line 5, change "50%.consequently," to --50%.
                                                  Consequently,--
```

Signed and Sealed this

Twenty-eighth Day of October, 1986

[SEAL]

Attest:

DONALD J. QUIGG

*Attesting Officer*    *Commissioner of Patents and Trademarks*